Feb. 22, 1927.
G. M. CROSS
1,618,516
SPRING TENSION NEUTRALIZER
Filed Oct. 22, 1925     3 Sheets-Sheet 1
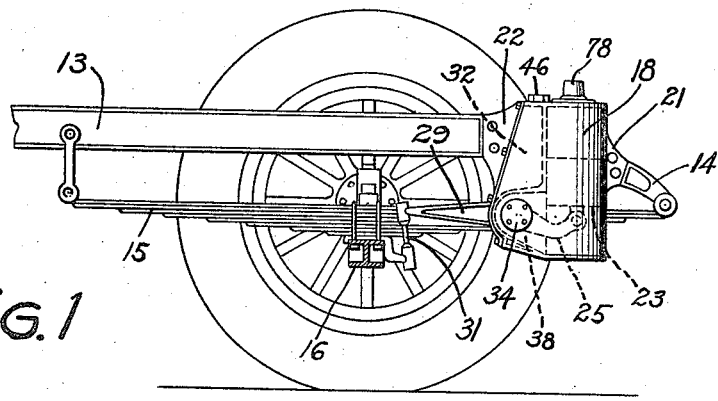
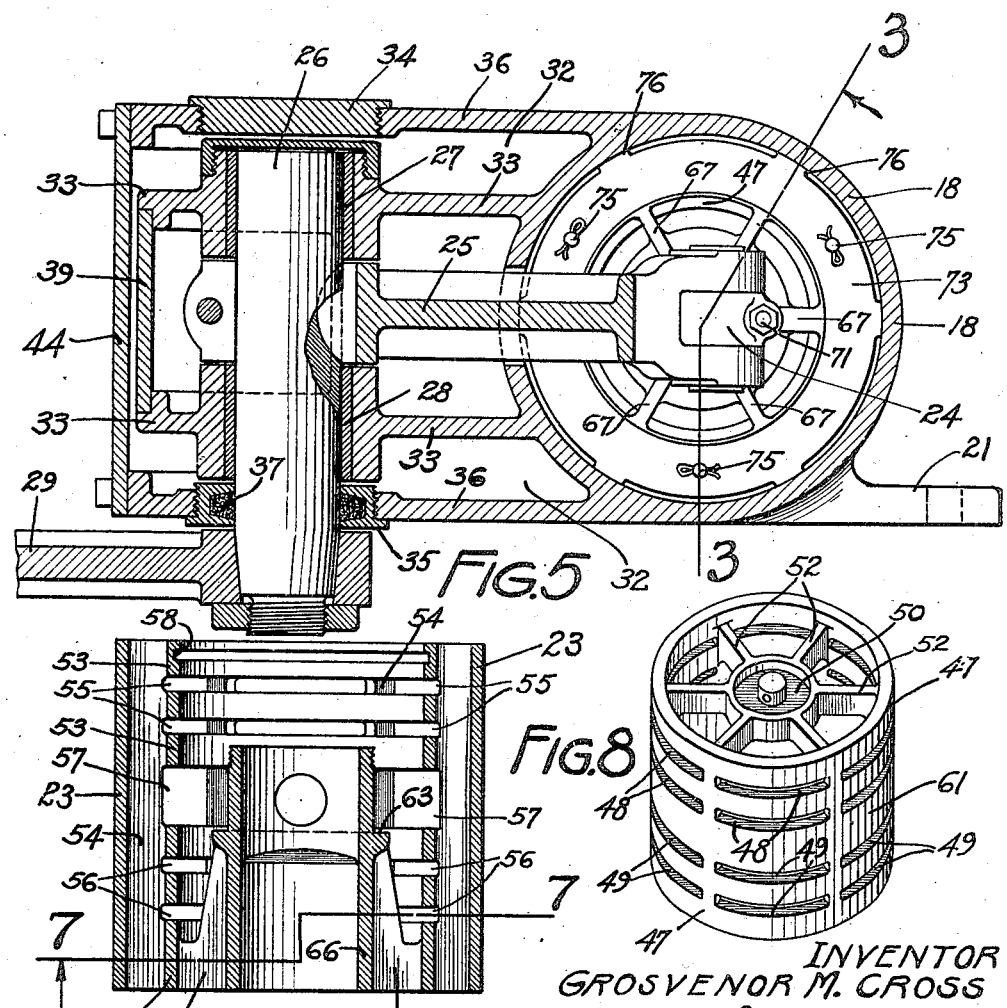
INVENTOR
GROSVENOR M. CROSS
ATTORNEYS

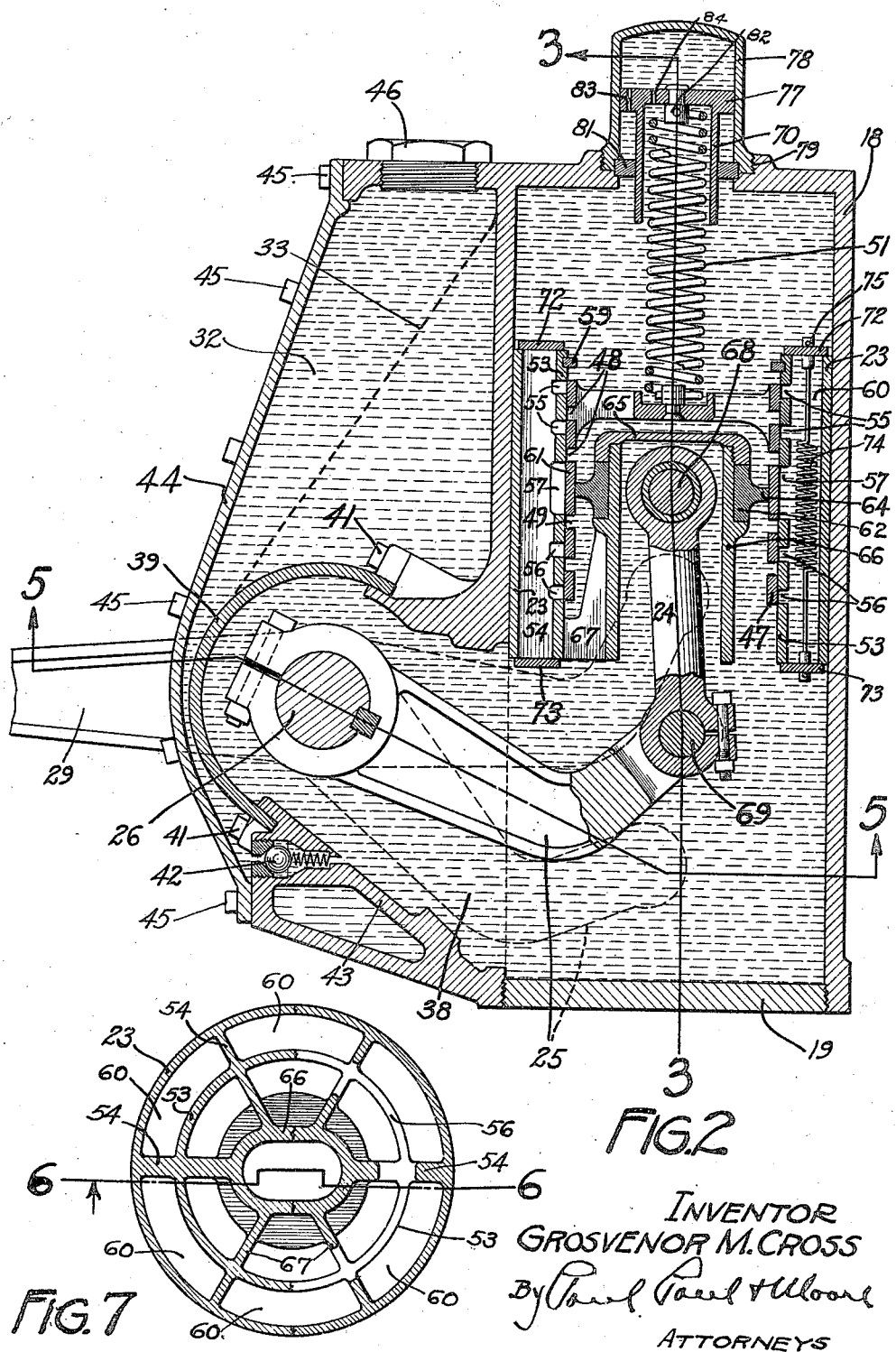

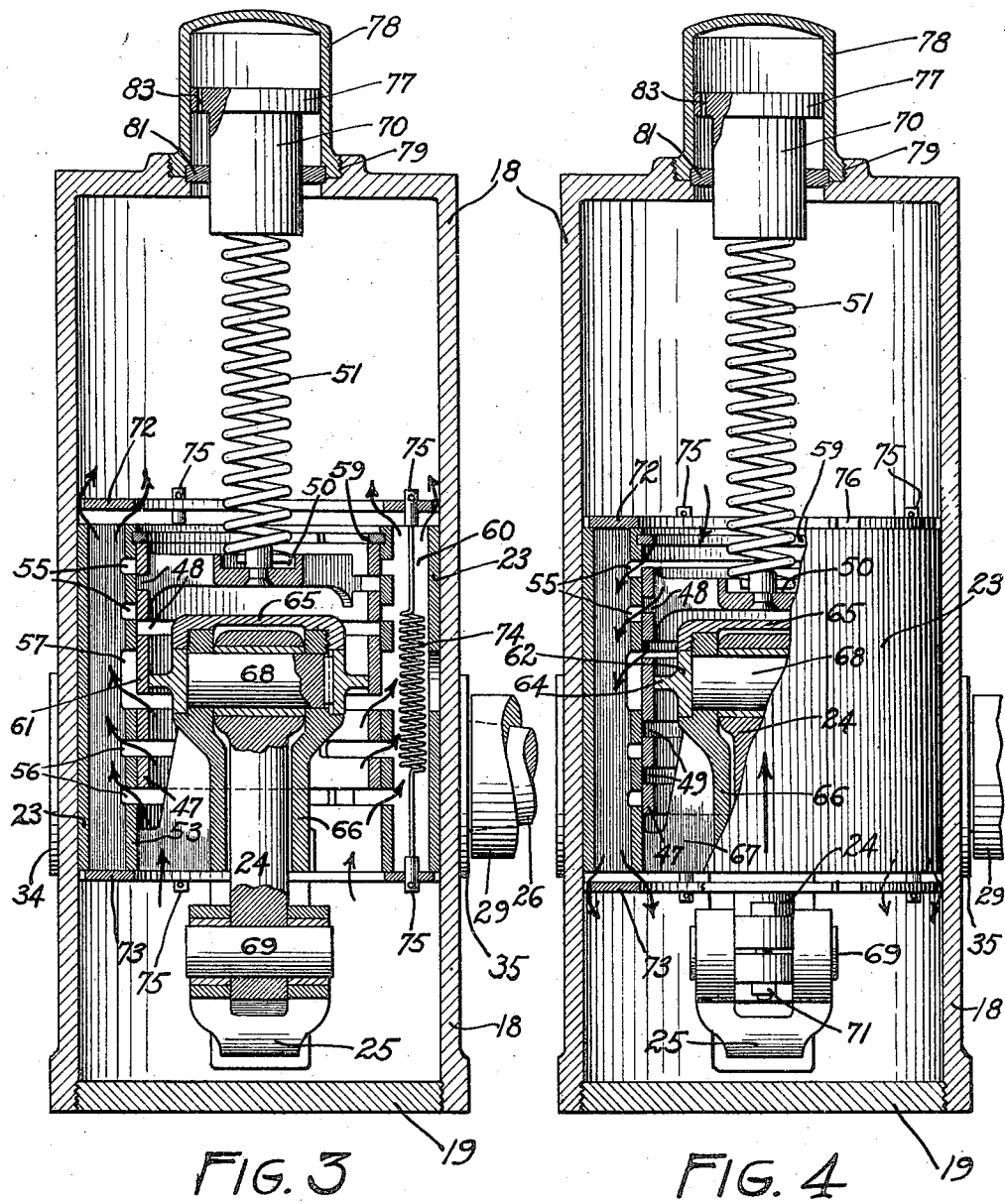

Patented Feb. 22, 1927.

1,618,516

UNITED STATES PATENT OFFICE.

GROSVENOR M. CROSS, OF MINNEAPOLIS, MINNESOTA.

SPRING-TENSION NEUTRALIZER.

Application filed October 22, 1925. Serial No. 64,159.

This invention relates to an improved device or mechanism for neutralizing spring tensions and more particularly relates to such a device adapted for use on vehicles, such as automobiles, to neutralize the tension of the springs after abnormal compression or expansion, caused by a rough road surface; thereby preventing sudden shocks or jolts being transmitted to the body of the vehicle and the occupants thereof.

The primary object of the invention is to provide a device for a neutralizing vehicle spring tensions so designed and constructed as to positively neutralize or offset the reaction resulting from the increased or decreased tension of the vehicle springs when the wheels pass over a rough roadway, thereby causing the line of body travel to be substantially free from sudden rises or drops and insuring smooth riding of the vehicle.

A further object of the invention is to provide such a device of the hydraulic type comprising a fluid-filled cylinder having a valve mechanism therein operable by the relative movement of the vehicle body and axle to prevent sudden shocks or jolts being transmitted from the axle to the body.

A further object is to provide a spring neutralizer having means for automatically adjusting it to load variations, thereby causing it to function equally well whether the vehicle is carrying a light or heavy load.

The particular object of the invention therefore, is to provide such a device or mechanism particularly adapted for use on automobiles, and the like, for neutralizing changes in spring tensions after initial flexing thereof, caused by the wheels passing over rough or irregular surfaces in the roadway.

Other objects of the invention will appear from the following description and the accompanying drawings and will be pointed out in the annexed claims.

In the drawings, there has been disclosed a structure designed to carry out the various objects of the invention, but it is to be understood that the invention is not confined to the exact features shown, as various changes may be made within the scope of the claims which follow.

In the accompanying drawings forming part of this specification,

Figure 1 is an elevational view of a portion of an automobile showing a method of mounting the improved neutralizer thereon;

Figure 2 is a vertical sectional view through the device showing the general construction thereof and also showing the parts in neutral or normal position;

Figure 3 is a sectional view on the lines 3—3 of Figures 2 and 5 showing the valve mechanism in the position assumed when one of the automobile wheels encounters a bump in the roadway and causes the axle to move toward the body when the device is mounted, as shown in Figure 1;

Figure 4 is a similar view showing the position of the parts when the automobile spring commences to expand or return to its normal position;

Figure 5 is a horizontal section view on the line 5—5 of Figure 2;

Figure 6 is a sectional view on the line 6—6 of Figure 7;

Figure 7 is a cross sectional view on the line 7—7 of Figure 6;

Figure 8 is a perspective view of the inner sleeve valve removed from the piston.

In the selected embodiment of the invention here shown for purposes of disclosure, there is illustrated a portion of an automobile chassis comprising the usual side beam 13, spring hanger 14, spring 15 and axle 16, supported by the usual wheels 17.

The novel structure featured in this invention preferably comprises a cylinder 18 having its lower end-portion threaded to receive a closure or cap 19 as shown in Figure 2. The cylinder 18 is provided with suitable means, such as the flanges 21 and 22, for securing it to the automobile chassis or body as shown in Figure 1. The cylinder is shown mounted in an upright position but may, if desired, be mounted horizontally or at any desired angle. The cylinder is filled with a suitable inelastic fluid, such as oil, which cooperates with a mechanism mounted in the cylinder to counteract and neutralize the abnormal force or energy stored in the spring by its distortion when the wheels encounter bumps or depressions in the roadway.

This mechanism comprises an outer valve member 23 having a rod connected at one end, thereto. The other end of said rod is similarly connected to an arm 25 secured to a shaft 26 mounted in suitable bearings 27 and 28, as particularly shown in Figure 5.

An operating arm 29 is secured to one end of the shaft 26 and has a connection preferably to the axle of an automobile or other vehicle by means of a connecting rod or link 31 as shown in Figure 1. Suitable ball and socket joints are preferably provided at each end of the connecting rod 31 to allow for variations in the movement of the arm 29, caused by the relative up and down movement of the axle 16. The cylinder is preferably mounted upon the automobile body, and the outer valve member 23 is operatively connected to the axle 16, thereby causing relative movement of the valve members and cylinder each time the vehicle spring is compressed or expanded.

The bearings 27 and 28, upon which the arm 25 is mounted, are preferably arranged within the oil chamber 32 provided on one side of the wall of the cylinder 18, as shown in Figures 2 and 5, and are supported by means of flanges or ribs 33, preferably integrally formed with the walls of the cylinder. Threaded caps 34 and 35 are provided in the walls 36 of the oil chamber in axial alignment with the shaft 26 so that access may be had to the interior of the oil chamber for assembling the bearings and shaft therein as shown in Figure 5. The cap 35 adjacent the arm 29, is preferably provided with a suitable packing 37 to prevent oil leakage around the shaft 26.

Referring to Figure 2, it will be noted that the arm 25 is mounted in an off-set chamber 38 in communication with the lower portion of the cylinder 18. A cap 39 secured by screws 41 is mounted between the flanges or ribs 33 to separate the off-set chamber 38 from the auxiliary oil chamber 32.

A ball check valve 42, of ordinary construction, is mounted in the lower wall 43 of the off-set chamber 38 to provide communication between the chamber 38 and the reserve oil chamber 2. This valve functions to automatically supply additional oil or liquid to the cylinder 18 as the volume of oil therein decreases, through leakage. The opposed wall or cover 44 of the reserve oil chamber 32 is preferably demountably secured to the walls 36 by such means as screws 45, so that access may readily be had to the interior of the chamber for the purpose of assemblying the bearings and shaft therein. A filler cap 46 is provided for the introduction of oil or liquid.

The valve mechanism also includes an inner sleeve member 47 having preferably two groups of elongated openings or ports 48 and 49 in the wall thereof as particularly shown in Figure 8. A seat 50 is provided in the upper end of the inner valve member 47 adapted to receive one end of a coiled neutralizing spring 51 having its other end movably connected to the upper end of the cylinder as will subsequently be described.

The seat 50 may be integrally formed with the wall of the valve member 47 by radial arms 52 comparatively thin in cross section to cause less obstruction to the flow of oil through the valve. The outer and inner valve members are preferably concentric and chambers will be formed above and below them in the cylinder.

An intermediate wall 53 is provided in the outer valve member 23 spaced from the outer walls thereof by ribs or webs 54 as shown in Figures 6 and 7. Elongated ports 55 and 56 are provided, respectively, in the upper and lower portions of the intermediate wall 53, and between these ports a relatively wider opening or passage 57 is provided as particularly shown in Figure 6. The ports 55 and 56 are adapted to register with the ports 48 and 49 in the valve member 47. An annular groove 58 is provided in the upper end of the intermediate wall 53 of the outer valve member adapted to receive a split lock ring 59, as shown in Figures 2, 3 and 4 forming a stop for the upward movement of the inner member 47.

The band or zone 61 between the adjacent valve ports 48 and 49 of the valve member 47 is of sufficient width to close the relatively wider central port 57 in the intermediate wall 53 when the member 47 is in its central neutral position, as shown in Figure 2. When the valve member is positioned as here shown all of the ports will be closed to the passage of liquid therethrough, but it will be noted that the ports 55, 56 and 57 in the outer member 23 are so arranged with relation to the ports in the member 47 that, upon the slightest relative movement of the valve member 47 communication will be established between a cylinder chamber at the lower or upper end of the outer member 23, and the segmental spaces 60 between the outer wall of said member and the intermediate wall 53.

Means are also provided in the outer valve member to prevent the fluid from passing directly or axially through the inner valve member 47 and to direct it outwardly therefrom through the ports 48 and 49 when the outer valve member is moving through the body of fluid from neutral position to either end of the cylinder. Such means preferably consists of an annular ring or member 62 mounted in an annular seat 63 provided in the central portion of the outer member 23 as shown. This ring or member is provided with an outwardly projecting flange 64 of substantially the same diameter as the bore of the inner valve member 47, so that when the member 47 is mounted in the piston the flange 64 will slidably engage the central band or portion 61 of the valve member 47 and thus prevent the direct passage of liquid through the valve. A threaded cap 65 is mounted upon the upper end-portion of the central wall 66 of the outer member to secure the flanged member 62 to the seat 63. This cap also functions to prevent the passage of oil through the central portion of the valve mechanism around the connecting rod 24, and to provide a limit stop for the downward movement of the valve member 47 within the outer member by engagement with the radial arms 52. The central wall 66 of the outer member is preferably integrally formed with the lower part of the outer member by means of the radial arms, or webs, 67. These arms are preferably formed, as shown in the various figures of the drawings, to provide clearance for the lower edge of the inner valve member 47, when moved downwardly to the position shown in Figure 4. The wall 66 also forms a socket for the connecting rod 24. The lower portion of this wall 66 is preferably formed as shown in Figure 7 while the upper portion thereof, in horizontal alignment with the seat 63, is preferably enlarged to receive the upper end of the connecting rod 24 as shown in Figures 3 and 4. The upper portion of the wall 66 is also apertured to receive a pin 68 having one end keyed to the flanged ring or member 62 for the purpose of preventing the pin from rotating in its seat. By thus securing the pin 68 to the annular flanged member 62, a relatively wider bearing surface may be obtained between the connecting rod 24 and the pin. The lower end portion of the connecting rod 24 is preferably split on one side as shown in Figure 2 so that the pin 69 connecting it with the arm 25 may be secured to the connecting rod by the bolt 71. The size of the lower end of the connecting rod allows it to be inserted through the socket provided by the wall 66 in assembling the connecting rod in the valve members.

Annular plates 72 and 73 are mounted at each end of the outer valve member 23 to provide closures for the segmental spaces 60. These plates function as relief valves and are normally yieldably held in closed position by suitable tension springs 74, having their ends secured to studs 75. The plates 72 and 73 are also preferably provided upon their peripheries with extensions or tabs 76, for spacing the outer edges of the plates from the wall of the cylinder and providing clearance for the passage of liquid therethrough when the valve mechanism is in open position, as shown in Figures 3 and 4.

The means provided for connecting the upper end of the neutralizing spring 51 to the cylinder preferably consists of a head 70 provided with an annular flange 77 having a sliding fit in the bore of a cap 78 secured to the upper wall of the cylinder as by threads 79. The body of the head 70 also has a sliding fit within an annular ring 81 provided in the upper wall of the cylinder and secured by means of the cap 78, as is clearly shown in Figure 2. The body of the head 70 is also bored to receive the end of the spring 51 secured to the upper end of the head by means of a shouldered stud 82. A small orifice 83 is provided in the flange 77 to establish communication between the upper portion of the cap 78 and the annular space or chamber between the flange and the annular ring 81, and a similar orifice 84 is also provided in the upper end of the head to similarly establish communication between the upper portion of the cap 78 and the upper portion of the cylinder. These orifices are for the purpose of permitting the liquid to by-pass slowly from one side of the flange 77 to the other when the load in the vehicle is changed, and allow the valve members to change their normal position in the cylinder under varying vehicle loads without affecting the normal tension of the spring 51.

The operation is as follows:

We will follow in the present discussion of the operation of this neutralizer the method of attachment shown in Figure 1 and we will assume that the head 70 has come to rest in such a position in cap 78 that, when the body is its normal distance above the axle, the spring 51 will be at zero tension, providing the valve member 47 is in its central position, as shown in Figure 2. Head 70, and thus the upper end of spring 51, we will assume, as fixed at such a point in the end of the cylinder.

Between the upper and the lower chambers of the cylinder, lie the valve members 23 and 47, which affect and are affected by whatever difference in pressure may exist between these two chambers. Providing relief valves 72 and 73 are in place and the valve ports are closed, the various portions of outer valve member 23 form in effect a piston, closing the entire bore of the cylinder, except for the annular space occupied by the central portion 61 of the inner valve member 47. All these portions of member 23 act together and are connected to the rod 24; hence, any upward or downward force on rod 24 will be distributed to the fluid in the upper or lower chambers of the cylinder by an effective pressure area equal to the cross sectional area of the cylinder, minus the cross sectional area of the central ring 61 of the member 47. Fluid pressures in either chamber will be transmitted to the rod 24 by means of this same area, which is the total area of member 23 exposed to fluid pressure in the direction of the axis of the cylinder.

Similarly, it will be seen that any force exerted axially against inner valve member 47, will be distributed to the fluid in the cylinder by an effective pressure area equal to the cross sectional area of the central ring portion 61 of valve member 47; and that, conversely, pressures in either chamber of the cylinder will be transmitted to member 47 by means of this same area, which is the total area of member 47 exposed to fluid pressures in the direction of the axis of the cylinder.

The thickness of member 61 is established more or less arbitrarily; obviously, therefore, in any one neutralizer the effective pressure areas discussed above, will be fixed, and the ratio of them constant. This constant ratio we will call K, which will represent the ratio of the effective pressure area of valve member 23 (the cross sectional area of the cylinder minus the cross sectional area of the ring 61), to the effective pressure area of valve member 47 (the cross sectional area of ring 61), in any given machine.

Suppose the outer valve member 23 to be in approximately its mid position as shown in Figure 2, wherein member 47 is centered as shown and spring 51 is at zero tension. Suppose a downward force to be exerted on rod 24. This will create a slight pressure in the lower chamber of the cylinder, which, acting on the effective pressure face of member 61, forces member 47 upward, slightly compressing spring 51. Now the least upward movement of valve 47 will open the large-area ports 56 and the lower portion of port 57, which ports lead from the lower cylinder chamber into the outer segmental chambers 60; the fluid pressure therein opens valve 72 against the comparatively weak spring 74, and the fluid flows through into the upper cylinder chamber, allowing outer valve member 23 and rod 24 to descend with but negligible impedance. As member 23 descends, spring 51 draws member 47 into contact with stop ring 59, thus opening wide the ports 56 and the lower portion of port 57, and allowing the descent to continue unhampered. The position of the members during this descent is shown in Figure 3. Valve member 47, engaging with ring 59, travels downward with member 23 after the initial movement, thus extending spring 51, and putting it under tension.

Let the downward force on rod 24 carry the valve members well toward the bottom of their practicable stroke, and then cease. Relief valve 72 is again seated by tension of spring 74, while valve member 47 is held in its upward position, as in Figure 3, by tension of spring 51, caused by downward movement of the valve members.

Now suppose from this point an upward force is applied to the rod 24. This, distributed by the effective pressure area of the outer valve member 23, builds up a pressure in the upper cylinder chamber. This chamber is now completely closed, and thus meets inelastically the upward force on rod 24, until this force is of such a value that it transmits to the fluid a pressure which, acting on the effective pressure area of valve member 47, is sufficient to force member 47 downwards against the tension force of spring 51. As soon as member 47 is forced beyond its central position, ports 55 and the upper portion of port 57 are opened, allowing the fluid to pass from the upper cylinder chamber into the outer segmental chambers 60, and, by opening relief valve 73, into the lower chamber, allowing valve member 23 and rod 24 to rise in the cylinder, as shown in Figure 4.

The balance of forces at the moment when the upward force on rod 24 is sufficient to force valve member 47 downwards to its midposition, where it still barely closes ports 55 and 57, may be considered as follows. The force on rod 24 is distributed to the fluid by the effective pressure area of valve member 23. The fluid pressure thus developed acts on the effective pressure area of valve member 47, and must precisely balance the tensile force of spring 51, as we have stated the valve member 47 to be in midposition where its longitudinal movement is free. Now the forces exerted on any surfaces exposed to a fluid under pressure, are directly proportional to the areas of those surfaces; hence the upward force on rod 24 is to the effective pressure area of valve member 23 as the tensile force of spring 51 is to the effective pressure area of valve member 47. We have already called the ratio of these two pressure areas K. Hence, it is apparent, when valve 47 has been centered as described by a certain upward force on a rod 24, the upward force on the rod must be equal to K times the tension force of spring 51, or $K \times F$, where F represents the tension of spring 51 due to the lowering of valve members 47 and 23 in the cylinder F is thus a variable factor, depending upon the position of these valve members.

When the upward force on rod 24 is just equal to or less than this quantity $K \times F$, rod 24 will be held from moving upward. As soon, however, as the upward force on rod 24 becomes greater than $K \times F$, it is evident that the valve 47 will be forced downward beyond its midpoint, and the outer valve member 23 and rod 24 will be allowed to move upward as described. At every point in this upward movement, however, the upward force on the rod 24, will be opposed by the force $K \times F$, which it must exceed in order that member 23 may rise. Evidently the amount by which the force on rod 24 exceeds the force $K \times F$ will determine its rate or rise, as it will determine the extent of downward movement of member 47 below the midpoint. Evidently, also, as the valve member 23 rises, the valve of the variable F (the tension of spring 51) grows proportionately less, until it reaches zero at the midposition shown in Figure 2. Thus the value of K×F' decreases during the rise of the valve member; but this quantity K×F' will represent at all points in such rise, the retarding force exerted by the fluid on rod 24.

Similarly, suppose in the position of parts shown in Figure 2, an upward force is applied to rod 24. A slight pressure will be created in the upper cylinder chamber which will force valve member 47 downwards, opening ports 55 and the upper portion of port 57 opening relief valve 73, and allowing member 23 and rod 24 to rise freely in the cylinder. In this case the rising movement compresses spring 51.

Let us assume the upward force on the rod 24 to cease when member 23 is somewhere near the end of its travel, and a downward force to take its place. Relief valve 73 seats, and the downward force is opposed by the fluid in the closed lower chamber of the cylinder, as valve member 47 is held downward by compression of spring 51, thus keeping closed the ports 56 and the lower portion of port 57. As in the case of the upward return from the downward action already described, opposing pressure is developed, but in this case in the lower cylinder chamber. And similarly the downward force on rod 24 must be greater than K times the compressive force of spring 51, in order that the valve member 47 may be forced upward, opening the ports on its lower side and allowing member 23 and rod 24 to descend. And at all points in this return movement from the upper portion of the cylinder, entirely independent of the rate of this movement, the downward force on rod 24 will be opposed by a restraining force of K×F' where K is the ratio before described, and F' is the variable compressive force of spring 51 depending on the position of the valve members within the cylinder.

In considering the action of the neutralizer when attached to a vehicle, as for example in Figure 1, I will assume that operating arm 29 is equal in length to the effective length of arm or crank 25. Under these conditions as the axle rises to meet the body, the valve members will descend within the cylinder, the degree and rate of axle to body movement being always equal to the degree and rate of valve member to cylinder movement, and there will be no difference in leverage between the axle and rod 24.

Spring 51 is especially constructed for each vehicle spring with which it is desired to use one of these neutralizers. When the attachment is made as described (that is with the arms of equal length) it is obvious that the degree of deflection undergone by spring 51 when the axle moves beneath the body is at all times equal to the degree of deflection of the automobile spring beneath the body. Spring 51 will be at zero tension when the vehicle spring is at the normal riding point or when its upward tension just balances the weight of the body. Spring 51 is further constructed for this particular machine, so that the amount of change in tension per unit of longitudinal deflection of spring 51 is equal to the amount of change in tension per unit of vertical deflection of the vehicle spring, divided by the constant K, which we have already established by the relative areas of the valve members. Hence, any change in tension of the vehicle spring will always be accompanied by an exactly proportional change in tension of spring 51, the determining factor of the ratio of the tension changes being the constant K. Now when the vehicle spring is at its normal sustaining tension, spring 51 will be at zero tension. Thus at all points in the deflection of the vehicle spring, where it is expanded below its normal riding point, spring 51 will be compressed to a tension equal to the loss intension of the vehicle spring due to expansion, divided by the constant K.

At all points in the deflection of the vehicle spring where it is compressed above its normal riding point, spring 51 will be expanded to a tension equal to the added tension of the vehicle spring due to abnormal compression divided by the constant K. These calculations always consider valve member 47 to be centered within member 23, which is the critical position determining the pressure exerted by the machine.

When a wheel of a vehicle equipped as shown in Figure 1, strikes an elevation in the road surface, the axle rises beneath the body, which tends to rise much more slowly due to its inertia. This action draws the valve members downward in the cylinder, which initial movement, as described, meets with practically no resistance. At the crest of the elevation in the roadway, the axle stops rising. The body has already begun to rise slightly due to spring compression beneath it, and the added tension of the vehicle spring now tends to increase this rate of rise, throwing the body on upward.

As soon, however, as body moves away from the axle, when the vehicle spring begins to expand again, the valve members begin to move upward in the cylinder. This upward movement is resisted at all points by a force of K×F, where F is the variable tension of spring 51. Now by the special construction of spring 51, its tension at every point during this upward movement is equal to the added tension of the vehicle spring due to compression divided by K. Hence it will be seen, by cancellation of the constant K, that at every point in this upward return movement, there is exerted on rod 24 and hence between body and axle a retarding or opposing force exactly equal to the amount of the added spring tension.

From the point in the roadway where the axle ceases its upward movement, or from the point where the body starts to rise faster than the axle, to the point where the body has risen until again it is at its normal riding distance above the axle, the added or abnormal tension of the vehicle spring is exactly neutralized by this device, leaving in effect, the body supported only by the normal spring tension, which is equal to the weight of the car. That the body would rise between these points is due to the upward momentum given it by its slight upward movement during the initial compression of the spring. This momentum is sufficient to open the valve ports and the degree of this momentum will also determine the rate of upward rise during the retarding action of the neutralizer. Thus the vehicle body continues to rise from the crest of the road elevation at exactly the rate of rise given it by the initial flexing of the spring, until it reaches again its normal positon above the axle, insuring a line of body movement entailing the least possible shock as it is the line of least possible change in direction of movement.

It may be noted that it is essential to leave the initial flexing of the vehicle spring unneutralized as it is the change in spring tension during this part of the action which enables the wheels to pass over road obstacles of greater height than the clearance between axle and body without forcing these two members into contact, and which enables also the body to follow the major changes in road elevation.

The action of the machine on the drops in road elevation is similar. The wheel is allowed to drop unhampered, by the free upward movement of the valve members in the cylinder. When the bottom of the depression in the road is reached, the body tends to drop to the axle, but is met by the opposing force of the machine, shown to be K×F′. But here again F′ we have shown to be equal to the loss in tension suffered by the spring through expansion, and hence at all points after body and axle start to move towards each other, to the point where they are again at normal distance from each other, the loss in tension of the vehicle spring due to expansion is exactly balanced or neutralized by a sustaining pressure within the neutralizer. And again between these two points the effect is to hold the body from the axle with exactly a normal sustaining force equal to the weight of the body. The inital flexing of the spring has given the body a slight rate of downward movement and the momentum of this movement opens the valve within the cylinder so that again the body continues on precisely the line of movement given it during the moment of initial spring flexing, until it reaches a point at which it is again at a normal distance above the axle, on the line of movement entailing the least possible shock.

It may be noted that this neutralizer operates entirely by means of fluid pressures rather than by means of fluid or mechanical friction and is thus perfectly adapted to function accurately as the wheels pass over any form or size of obstruction or depression in the road way.

As the load in the vehicle equipped with these neutralizers is changed, it is apparent that the neutral riding point of the body above the axle will also be changed and the neutral position of the valve members within the cylinder as well. In order that the tension of spring 51 may always be zero at these varying neutral riding points, the attachment of its upper end must correspondingly move up or down. This adjustment is secured by the automatic load adjuster clearly disclosed at the upper end of the cylinder in Figure 2. Orifices 83 and 84 are relatively small, allowing the passage of only a slight amount of fluid. It is evident then that head 70 will relatively slowly come to rest within cap 78 at some position where the average of the tension and compression, rapidly undergone by spring 51 when the device is in operation, will be equal to zero; and further during each of these rapid variations of tension of spring 51 the head 70 will act practically as a solid connection between the upper end of spring 51 and the cylinder.

Now it is apparent that as the vehicle travels along the roadway and its supporting spring undergoes rapid expansion and compression, the average of these expansive and compressive variances from the normal must be equal to zero over any considerable stretch of roadway.

This follows from the fact that the body continues on an average height above the axle. Now the tensions of spring 51 when head 70 is correctly positioned as before described are exactly proportional to the compressions of the vehicle spring above normal, and the compressions of spring 51 are similarly proportional to the expansions of the vehicle spring below normal. Hence it follows that when head 70 is correctly positioned within cap 78, the average of the tensions and compressions of spring 51 will be zero, and head 70 will be maintained in that position. When the load in the vehicle is changed, and head 70 is no longer correctively positioned, the average of tensions and compressions of spring 51 will no longer be zero, and head 70 will be forced upward or downward until it reaches the correct position, thus securing automatic adjustment within the neutralizer to the change in load.

In actual operation, it will obviously not always be convenient to have arms 25 and 29 of the same length. When these are of different lengths, however, it is apparent that the neutralizer will function just as effectively. The travel of the valve members within the cylinder will be exactly proportional to the travel of the axle below the body, and allowance will be made in the structure of spring 51 for the difference in leverage, between rod 24 and the axle.

It may be noted that both rod 24 and link 31 extend from their respective arms in the same direction rotatively with reference to the shaft 26. That the length of link 31 is to the length of rod 24, as the length of arm 29 is to the length of arm 25, and that the angle comprehended between pins 68 and 69 and the shaft 26 is equal to the angle formed by rod 31 with rod 29, and that the angle between rod 24 and the axial line of the cylinder is equal to the angle between link 31 and the line of vertical movement of the axial. When the machine is thus mounted all the angles above mentioned as being equal will remain equal during all conditions of operation, and hence all changes of torque between valve member 23 and shaft 26, due to changes in the relative position of these parts, during the action of the neutralizer will be opposed and balanced by corresponding changes in torque between shaft 26 and the axle of the vehicle.

Evidently the neutralizer may be mounted in any desired position on the vehicle. If desired, it may be so mounted that compression of the vehicle spring is accompanied by rising of the valve members in the cylinder rather than by their falling. In this case it will be compression of spring 51 that governs the neutralizing action over road elevations rather than its tension, but the general action of neutralization will be the same.

I have shown and described my invention used with a vehicle having a leaf spring between the axle and body, but it will be understood that any other type of spring may be used, or any other desired form of yielding connection, as I do not wish to limit myself to the particular construction or arrangement shown herein.

I claim as my invention:

1. A vehicle having an axle and body members and a yielding connection between them in combination with means for neutralizing or balancing the reaction of the abnormal force or tension of said yielding connection by means of an opposing force equal to the abnormal force or tension of said yielding connection at all points.

2. A vehicle having an axle and body elements and a yielding connection between them, in combination with means adapted to allow freedom of initial flexing of said yielding connection in either direction and neutralize or balance the reaction of the abnormal force or tension of such yielding connection due to or resulting from such flexing.

3. A vehicle having an axle and body element and a yielding connection between them, in combination with fluid controlled means adapted to allow freedom of initial flexing of said yielding connection and oppose the reaction of the abnormal force or tension of such yielding connection due to or resulting from such flexing, the degree of opposing force being greater at large deflections of said yielding connection and lesser at small deflections thereof.

4. A vehicle comprising axle and body members and a yielding connection between them in combination with a cylinder secured to one of said members and adapted to contain an inelastic fluid, and a valve mechanism comprising outer and inner relatively movable members in said cylinder having relatively non-yielding and yielding means for connection with said axle and body member respectively, and provided with means for passage of the inelastic fluid from one side to the other of said valve mechanism.

5. A vehicle having an axle and body members and a yielding connection between them, in combination with a container for an inelastic fluid, and valve members therein having means for connection respectively with said container and one of said axle and body members, one of said valve members having a yielding connecting means, said valve members having means for the passage of the inelastic fluid and cooperating therewith to counteract or offset the reactive force stored in said yielding connection through the initial flexing thereof.

6. A vehicle comprising axle and body members and a yielding connection between them in combination with a container secured to one of said members and adapted to contain an inelastic fluid, valve members concentrically arranged in said container and having means for the passage of such inelastic fluid, said valve members being relatively movable, one member having a yielding connection with said container and the other member having means for connection with one of said vehicle members, said valve members cooperating with the inelastic fluid to counterbalance or offset the reactive forces stored in said yielding connection through the rise and fall of said vehicle members.

7. A vehicle comprising axle and body members and a yielding connection between them, in combination with means for neutralizing or balancing the reaction of the abnormal force or tension of such yielding connection following initial flexing of the same, said means comprising valve members mounted for relative movement and connected respectively with said members, and an inelastic fluid container wherein said valve members are mounted.

8. A vehicle comprising axle and body members and a yielding connection between them, in combination with a container secured to one of said members and adapted to contain an inelastic fluid, relatively movable valve members arranged in said container and having ports therein for the passage of such inelastic fluid, one valve member having means for connection with one of said vehicle members, a helical spring connecting the other valve member with the other vehicle member, said helical spring and said valve members cooperating with the inelastic fluid to counteract or balance the reactive force stored in said yielding connection through the initial flexing thereof.

9. A vehicle having axle and body members and a yielding connection between them, in combination with a container adapted to be secured to one of said members and contain an inelastic fluid, valve members in said container, one having a spring connection with said container and the other a connection with one of said vehicle members, said valve members being adapted for passage of the inelastic fluid, the effective areas of the surfaces of said members exposed to the inelastic fluid having a relative predetermined ratio to the power of said yielding connection and said spring.

10. A device of the class described comprising a container adapted to be secured to a vehicle body and having an inelastic fluid therein, concentrically arranged valve members in said container, one of them having means for connection with the vehicle axle and the other having a yielding connection with said container, said valve members being mounted for relative movement and having means for the passage of the inelastic fluid, the area of the surfaces of said valve members exposed to the action of the inelastic fluid having a relative predetermined ratio to the power of the vehicle spring and said yielding connection of said yielding connection and the vehicle spring.

11. A vehicle having an axle and body members and a spring connection between them, in combination with a container for an inelastic fluid secured to one of said vehicle members, relatively movable valve members in said container having ports therein for the passage of the inelastic fluid, one of said valve members having means for connection with the other vehicle member, yielding means connected to the other valve member and having a cushion connection with said container, said yielding means cooperating with said valve members and the inelastic fluid to neutralize the reactive forces stored in said vehicle spring through the initial flexing thereof.

12. A device of the class described comprising a cylinder adapted to contain an inelastic fluid, inner and outer relatively movable valve members in said cylinder having ports for the passage of the inelastic fluid therethrough, one of said valve members having a yielding connection with said cylinder, the other valve member and said cylinder having means for connection respectively with the vehicle axle and body, and said valve members and their connections cooperating with the inelastic fluid to neutralize the abnormal force stored in the vehicle spring through the initial flexing thereof.

13. A device of the class described comprising a cylinder adapted to contain an inelastic fluid, inner and outer valve members mounted for relative movement in said cylinder and having means for the passage of the inelastic fluid, and said outer member having passages leading therethrough and relatively movable relief valves for opening and closing said passages, said inner member having a yielding connection with said cylinder and said cylinder and said outer valve member having means for connection respectively with the vehicle body and axle.

14. In combination with a vehicle spring and body, a cylinder adapted to contain an inelastic fluid, relatively movable concentrically arranged valve members in said cylinder, the outer member having means for connection with the vehicle axle, a helical spring connecting the inner valve member with said container, said valve members having means for the flow of inelastic fluid therethrough, and relief valves adapted to be opened through the movement of said valve members, said inner valve member having surfaces exposed to the pressure of the inelastic fluid thereon, and said valve members and their connections cooperating with the inelastic fluid to neutralize the reactive forces stored in the vehicle spring through the initial flexing thereof.

15. A method of preventing shock or jar to a vehicle body which consists in counterbalancing or neutralizing the abnormal reactive force or energy stored in the vehicle spring through the initial flexing or tensioning thereof.

16. A method of preventing shock or jar to a vehicle body which consists in permitting freedom of initial flexing of the vehicle spring and then neutralizing the abnormal reactive force stored in said spring through the initial flexing thereof.

17. A vehicle comprising axle and body members and a yielding connection between them, in combination with a cylinder secured to one of said members and adapted to contain an inelastic fluid, inner and outer valve members in said cylinder, one of said members having means for connection with the other vehicle member, a helical spring connecting the other valve member with said cylinder, said valve members having areas exposed to the fluid pressure in said cylinder, the power of the helical spring compared to the power of the vehicle spring being in direct ratio to the areas of said valve members exposed to the fluid pressure.

18. A spring tension neutralizing device comprising a container for an inelastic fluid, valve members within said container, said container and one of said valve members having means for connection with the body and running gear of a vehicle, a helical spring connected to the other valve member and to said container, the connection of said spring to said container adapting it for different neutral positions of said valve members in said container under varying loads in the vehicle without affecting the normal tension of said spring.

19. A vehicle having axle and body members and a yielding connection between them, a cylinder adapted to contain an inelastic fluid secured to one of said members, a valve mechanism comprising inner and outer members in said cylinder, means connecting one of said valve members with the other vehicle member, yielding means connected to the other valve member and having an automatically adjustable connection with said cylinder adapted to allow the normal position of said valve members in said cylinder to be changed under varying vehicle loads without affecting the normal tension of said yielding means.

20. A vehicle axle and body having a yielding connection between them and a device connected to said axle and body and adapted to allow freedom of initial flexing of said yielding connection, said device being also adapted to resist the reactive force stored in said yielding connection by such flexing, the degree of such resistance being variable proportionately to the degree of deflection of said yielding connection from normal.

21. A method of preventing shock or jar to the body of a vehicle which consists in opposing the reaction of the abnormal forces stored in the yielding means connecting the body to the axle, the value of the opposing forces being directly proportional to the degree of deflection of the yielding means from normal.

22. A method of preventing shock or jar to the body of a vehicle which consists in opposing the reaction of the abnormal forces in the yielding means connecting the body and axle members, the abnormal forces being caused by deflection of said yielding means above or below its normal sustaining position, due to irregularities in the roadway, the value of the opposing forces being variable, greater at large deflections of the yielding means from normal, lesser at small deflections of the yielding means from normal.

23. A vehicle consisting of body and axle members and a yielding means between them, in combination with a device to oppose the reaction of the abnormal forces in said yielding means caused by expansion or contraction of said yielding means due to irregularities in the roadway, the value of the opposing forces being variable, greater at large deflections of said yielding means from normal, lesser at small deflections of said yielding means from normal.

24. A vehicle comprising body and axle members, and a yielding means between them, in combination with a device adapted to oppose the reaction of the abnormal forces stored in said yielding means by deflection due to irregularities in the roadway, and means for automatically adjusting the values of the opposing forces to conform to different loads of the vehicle body.

25. A device for cushioning the movement of two relatively movable members, having a yielding connection between them, comprising a means for neutralizing or balancing the reaction of the abnormal force or tension of said yielding connection by a force equal to the abnormal force or tension of said yielding connection at all points.

26. A means for cushioning the movement of two relatively movable members having a yielding connection between them, comprising a fluid controlled means adapted to allow freedom of initial flexing of said yielding connection and neutralize or balance the reaction of the abnormal force or tension of such yielding connection due to or resulting from such flexing, the degree of the neutralizing or balancing force being greater with large deflections of said yielding connection and lesser at small deflections of said yielding connection from normal.

27. A device for cushioning the movement of two relatively movable members having a yielding connection between them, comprising a fluid controlled means adapted to allow freedom of initial flexing of said yielding connection, said device being also adapted to resist the reactive force stored in said yielding connection by such flexing, the degree of such resistance being variable proportionately to the degree of deflection of said yielding connection from normal.

28. A spring neutralizing device comprising a container for an inelastic fluid, valve members concentrically arranged within said container and having a relative reciprocating movement therein, said container and one of said valve members having means for connection with the body and running gear of a vehicle, a helical spring connected at one end to the other member, a head mounted to reciprocate in the wall of said container and connected to the other end of said spring, said head being adapted for movement whereby said valve members may change their normal position in said container under varying vehicle loads without affecting the normal tension of said spring.

29. A means for cushioning the movement of two relatively movable members having a yielding connection between them, comprising a cylinder secured to one of said members and adapted to contain an inelastic fluid, inner and outer valve members in said cylinder, one of said members having means for connection with the other movable member, a helical spring connecting the other valve member with said cylinder, said valve members having areas exposed to the fluid pressure in said cylinder, the power of the helical spring compared to the power of said yielding connection being in direct ratio to the areas of said valve members exposed to the fluid pressure.

30. A spring tension neutralizing device comprising a container for an inelastic fluid, valve members within said container, said container and one of said valve members having means for connection with the body and running gear of a vehicle, a spring connected to the other valve member, a cap mounted on said container, a head movable in said cap and connected to said spring, said cap being adapted to contain an inelastic fluid, and said head having means to permit the fluid to pass slowly from one side of the head to the other when the load in the vehicle is changed, whereby said valve members may change their normal position in said container under varying vehicle loads without affecting the normal tension of said spring.

31. A spring tension neutralizing device comprising a container for an inelastic fluid, valve members within said container, said container and one of said valve members having means for connection with the body and running gear of a vehicle, a spring connected to the other valve member, a cap mounted on said container, a head movable in said cap and connected to said spring and having an annular flange provided with a port therethrough, said cap being adapted to contain an inelastic fluid to pass slowly through said port from one side of the head to the other when the load in the vehicle is changed whereby said valve members may change their normal position in said container under varying vehicle loads without affecting the normal tension of said spring.

32. A vehicle having axle and body members and a yielding connection between them, a cylinder adapted to contain an inelastic fluid secured to one of said members, a valve mechanism comprising inner and outer members in said cylinder, means connecting one of said valve members with the other vehicle member, a helical spring having one end connected to the other valve member, a head connected to the other end of said spring, a cap adapted to contain an inelastic fluid mounted in said cylinder and wherein said head is movable, said head having a by-pass for allowing the inelastic fluid to flow slowly from one side to the other thereof, and permit the normal position of said valve members and said cylinder to be changed under varying vehicle loads without affecting the normal tension of said helical spring.

33. A device of the class described comprising a container adapted to be secured to a vehicle body and having an inelastic fluid therein, concentrically arranged valve members in said container, one of them having means for connection with a vehicle axle, and the other having a yielding connection with said container, said valve members being mounted for relative movement, said container having chambers therein above and below said valve members, said inner valve member having ports therein and said outer valve member having means to prevent the fluid from passing axially through said inner member and directing it outwardly to said ports.

In witness whereof, I have hereunto set my hand this 19th day of October, 1925.

GROSVENOR M. CROSS.